(12) United States Patent
Ansell (10) Patent No.: US 7,001,138 B2
(45) Date of Patent: Feb. 21, 2006

(54) SPLIT COLLAR FOR MECHANICAL ARM CONNECTION

(75) Inventor: Scott F. Ansell, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 154 days.

(21) Appl. No.: 10/375,631

(22) Filed: Feb. 27, 2003

(65) Prior Publication Data

US 2004/0037688 A1 Feb. 26, 2004

Related U.S. Application Data

(60) Provisional application No. 60/360,652, filed on Mar. 1, 2002.

(51) Int. Cl.
*B25J 17/00* (2006.01)

(52) U.S. Cl. .............................. 414/744.2; 29/898.08; 74/490.05; 414/744.5; 901/28

(58) Field of Classification Search .............. 414/744.1, 414/744.5, 744.2; 901/15, 28; 384/273; 277/489, 277/491; 29/898.08, 898; 74/490.05
See application file for complete search history.

(56) References Cited

U.S. PATENT DOCUMENTS

| | | |
|---|---|---|
| 1,681,839 A | 8/1928 | Breton |
| 4,324,353 A | 4/1982 | Brantley et al. |
| 4,365,395 A | 12/1982 | Brantley |
| 4,375,992 A | 3/1983 | Stevens et al. |
| 4,495,313 A | 1/1985 | Larsen |
| 4,640,489 A | 2/1987 | Larsen |
| 4,680,336 A | 7/1987 | Larsen et al. |
| 4,761,069 A | 8/1988 | Truong et al. |
| 4,782,946 A | 11/1988 | Pollak |
| 4,889,664 A | 12/1989 | Kindt-Larsen et al. |
| 4,967,812 A | 11/1990 | Herzog |
| 5,036,971 A | 8/1991 | Seden et al. |
| 5,039,459 A | 8/1991 | Kindt-Larsen et al. |
| 5,072,880 A | 12/1991 | McCloud |

(Continued)

FOREIGN PATENT DOCUMENTS

| | | |
|---|---|---|
| EP | 0 453 231 B1 | 10/1991 |
| EP | 0 686 488 B1 | 12/1995 |
| EP | 0 740 988 A | 11/1996 |
| EP | 0453 232 B1 | 3/1997 |
| EP | 806 286 A2 | 11/1997 |
| EP | 0 824 063 A3 | 2/1998 |
| EP | 0 824 063 A2 | 2/1998 |
| EP | 1 048 443 A2 | 11/2000 |
| GB | 2 040 213 A | 8/1980 |
| GB | 2 237 241 A | 5/1991 |
| WO | WO 97/13635 | 4/1997 |
| WO | WO 00/12296 | 3/2000 |
| WO | WO 00/13882 | 3/2000 |
| WO | WO 01/32408 A2 | 5/2001 |

*Primary Examiner*—Donald W. Underwood (57) ABSTRACT

A robot assembly and a method of installing a collar on a robot assembly. The robot assembly comprises a support shaft, an arm extending away from the shaft, a split connecting collar pivotally mounted on the support shaft and connected to the arm to connect the arm to the support shaft, and a tool connected to the arm for engaging the molded items and for removing the molded items from the molding machine. Two embodiments of the split collar are disclosed. The first is a multiple piece component, and the second is a single slotted body. Generally, both of these collars are designed such that installation or removal does not require that the shaft be pushed linearly through the diameter of the collar. Rather, the installation or removal of the collar is performed by moving the collar, or the collar components, away from the shaft, in a direction perpendicular to the shaft centerline instead of along and over the shaft diameter to the endpoint.

10 Claims, 10 Drawing Sheets

U.S. PATENT DOCUMENTS

| | | |
|---|---|---|
| 5,080,839 A | 1/1992 | Kindt-Larsen |
| 5,094,609 A | 3/1992 | Kindt-Larsen |
| 5,143,101 A | 9/1992 | Mor |
| 5,172,450 A | 12/1992 | Cole et al. |
| 5,264,161 A | 11/1993 | Druskis et al. |
| 5,271,875 A | 12/1993 | Appleton et al. |
| 5,407,062 A | 4/1995 | Shannon et al. |
| 5,476,111 A | 12/1995 | Andersen et al. |
| 5,490,959 A | 2/1996 | Nunez et al. |
| 5,524,419 A | 6/1996 | Shannon |
| 5,540,541 A | 7/1996 | Gosdowski et al. |
| 5,540,543 A | 7/1996 | Lust et al. |
| 5,616,184 A | 4/1997 | Duncan et al. |
| 5,640,980 A | 6/1997 | Keene et al. |
| 5,649,410 A | 7/1997 | Martin et al. |
| 5,681,138 A | 10/1997 | Lust et al. |
| 5,690,866 A | 11/1997 | Andersen et al. |
| 5,706,634 A | 1/1998 | Edwards et al. |
| 5,722,536 A | 3/1998 | Pierce et al. |
| 5,762,081 A | 6/1998 | Keene et al. |
| 5,804,107 A | 9/1998 | Martin et al. |
| 5,836,323 A | 11/1998 | Keene et al. |
| 5,895,192 A | 4/1999 | Parnell, Sr. et al. |
| RE36,302 E | 9/1999 | Kindt-Larsen et al. |
| 5,980,184 A | 11/1999 | Lust et al. |
| 6,007,229 A | 12/1999 | Parnell, Sr. et al. |
| 6,039,899 A | 3/2000 | Martin et al. |
| 6,068,798 A | 5/2000 | Lesczynski et al. |
| 6,077,031 A | 6/2000 | Lust et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,393,652 B1 | 5/2002 | Vogt |

SPLIT COLLAR FOR MECHANICAL ARM CONNECTION

CROSS REFERENCE TO RELATED APPLICATION

This application claims priority to U.S. Provisional Application Ser. No. 60/360,652, filed Mar. 1, 2002, and having the same title and incorporated herein in its entirety by reference.

BACKGROUND OF THE INVENTION

1. Field of the Invention

This invention generally relates to robot assemblies that are used to remove molded items from molding machines, and more specifically, to robot assemblies that are used to remove items, referred to as lens curves, from high speed automated molding machines. Even more specifically, the invention relates to a split collar design for use on such robot assemblies.

2. Background Art

In the last several years, various molding machines have been developed to mold lens curves on a high speed, automated basis. These lens curves are then used to mold contact lenses. Such systems are disclosed, for example, in U.S. Pat. No. 5,702,735 and U.S. patent application Ser. No. 09/305,886 filed May 5, 1999 for "Mold and Molding Machine for Making Ophthalmic Devices". In these systems, robot assemblies are commonly used to remove the lens curves from the molding machines.

In the operation of these molding machines, more specifically, two mold sections, or halves, are closed, a plastic is injected into the machine to form two types of lens curves, referred to as front and back curves, and the mold is then opened. An arm of the robot assembly is inserted between the mold sections to grip or engage the front and back curves, and then the robot arm carries those curves away from the molding machine.

Molding machines of this type have been successfully developed that operate on a high speed, mass production basis. In these high speed operations, the robot assemblies also operate at comparatively high speeds, and because of this, it becomes necessary occasionally to replace worn or damaged parts of the robot assemblies.

In particular, the robot arm, or components of the arm, occasionally needs to be replaced. In part, this is due to the fact that, in operation, the arm rapidly moves to and fro, into and then out of the molding machine, engaging, carrying and then releasing the front and back curves.

Replacing the arm can be difficult, however, due to machine guarding and limited access to the robot assembly for personnel and tools. Moreover, it is highly desirable to replace the arm quickly since the operation of the robot assembly, and the entire molding system, is interrupted while the arm is being replaced.

SUMMARY OF THE INVENTION

An object of this invention is to improve robot assemblies that are used to remove molded items from molding machines.

Another object of the present invention is to provide an improved design for the fast replacement of damaged connection components on high speed mechanical swing arm assemblies.

A further object of the invention is to remove a collar or connecting rod that is used to make a connection between an arm and a supporting shaft, by moving the collar, or the collar components, away from the shaft in a direction perpendicular to the shaft centerline. Thereby avoiding the required disassembly of the shaft which required complicated tools and multiple hours of downtime for the molding machine.

These and other objectives are attained with a robot assembly and a method of installing a collar on a robot assembly. The robot assembly comprises a support shaft, an arm extending away from the shaft, a split connecting collar pivotally mounted on the support shaft and connected to the arm to connect the arm to the support shaft, and a tool connected to the arm for engaging the molded items and for removing the molded items from the molding machine.

Two embodiments of the split collar are disclosed. The first is a multiple piece component, and the second is a single slotted body. Generally, both of these collars are designed such that installation or removal does not require that the shaft be pushed linearly through the diameter of the collar. Rather, the installation or removal of the collar is performed by moving the collar, or the collar components, away from the shaft, in a direction perpendicular to the shaft centerline instead of along and over the shaft diameter to the endpoint. This is in contrast to a one-piece collar that encircles the shaft that would require disassembly of the shaft using complicated tools and causing multiple hours of downtime for the molding machine. Using this invention, the robot can be removed and replaced in less than one hour using simple hand tools.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 9A and 9B illustrate the top and edge views of a typical Front Curve.

DETAILED DESCRIPTION OF THE PREFERRED EMBODIMENTS

Figure 1:
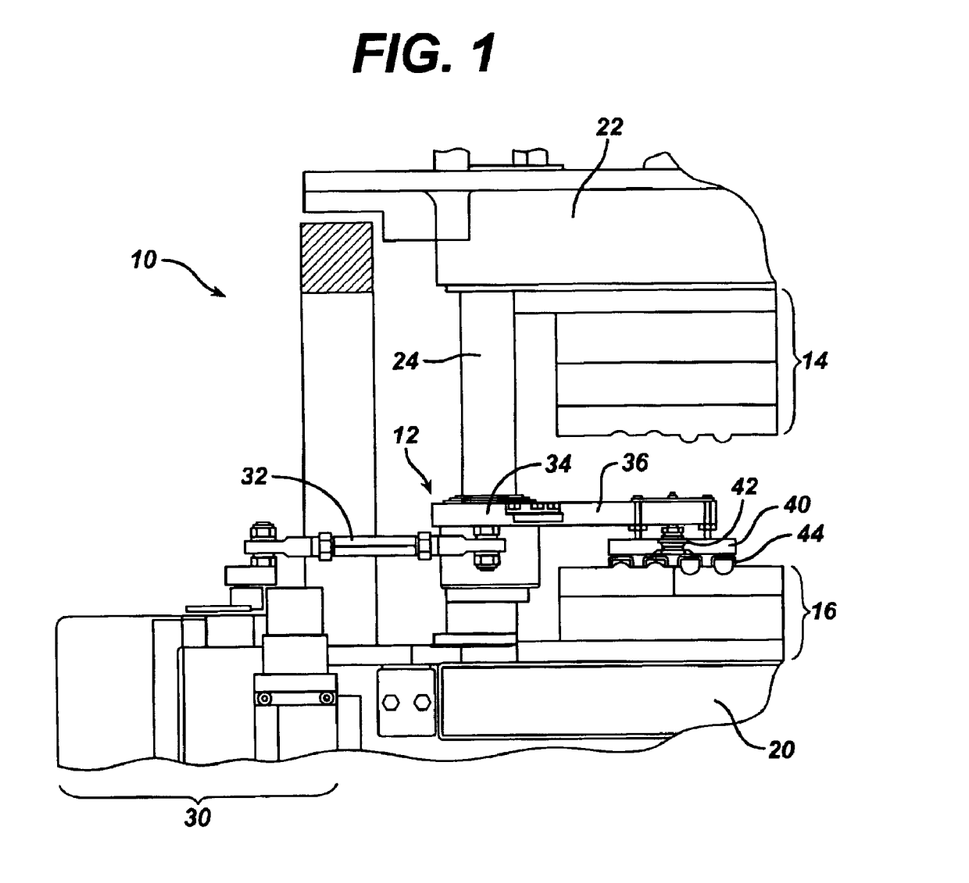
FIG. 1 shows a robot assembly and portions of a molding machine.

FIG. 1 illustrates an injection molding machine 10 and a robot assembly 12 embodying the present invention. Machine 10, generally, comprises an upper mold half 14, a lower mold half 16, movable platen 20, and supporting plate 22. The lower mold half 16 is removably mounted onto the movable platen 20, and the upper mold half 14 is removably mounted onto the supporting plate 22, which preferably remains stationary. In use, the lower mold half 16 and the movable platen 20 move up and down to close and open the mold. The movable platen preferably moves up and down under the action of a cylinder, lift or other lifting means. The mold halves are aligned by moving platen 20 along shaft 24 which is preferably stationary. Preferably three additional shafts (not shown) are present at each corner of the movable platen 20. The movable platen has corresponding apertures (not shown) preferably located at the corners of the platen, through which the shafts pass. The shafts preferably are removably attached to the supporting plate 22 onto which the upper mold half is removably mounted. The ends of the shafts that pass through platen 20 are removably or fixedly attached to the machine base (not shown) that preferably is removably or fixedly attached to the floor.

In the operation of molding machine 10, the mold halves 14 and 16 are closed, and a plastic is injected into the interior thereof to form a set of front and back lens curves. After a short period, the mold halves separate, and in particular, the movable platen 20 and the lower mold half 16 move to the open position shown in FIG. 1. The molded lens curves are then removed from the lower mold half via robot 12.

Molding machine 10 is described in greater detail in U.S. Pat. No. 5,702,735 and in U.S. patent application Ser. No. 09/305,886 for "Mold and Molding Machine for Making Ophthalmic Devices", the entire disclosures of which are herein incorporated by reference.

Robot 12 comprises a drive mechanism 30, connecting rod 32, collar 34, arm 36, and end of arm tool 40. Generally, in operation, the robot arm 36 moves horizontally in between the upper mold half 14 and the lower mold half 16 when these mold halves are open, as shown in FIG. 1. Also, the robot arm 36 moves horizontally in the opposite direction, out of the area between the mold halves, when the lower mold half is moved toward the upper mold half to form a closed mold. In the preferred embodiment, the robot 12 is a direct drive robot; that is, the drive mechanism 30 for the robot rides up and down with the movement of the moveable platen 20 of the molding machine 10. Additionally, preferably collar 34 of robot 12 is supported by and rides along shaft 24 in operation of the molding machine 10 as the mold halves are opened and closed.

Gears and rotatable cogs (not shown) are used to move the robot horizontally in between and out of the mold halves 14 and 16 when the mold opens and closes, respectively. After the robot moves horizontally into position between the mold halves, the end of arm tool 40 is lowered close to the surface of the lower mold half (as shown) by vacuum extender 42, which moves the end of arm tool up and down. The vacuum extender is connected to a vacuum source (not shown), and is operated to move the end of arm tool up and down.

When the end of arm tool 40 is moved downward, the molded curves are ejected from the lower mold half. Preferably, the end of arm tool has transfer tips 44, that may be cups that are connected to a vacuum source (not shown) that is activated to pick-up the molded curves. When the lower mold half moves toward the stationary upper mold half, the robot, through direct drive mechanism 30, moves out from between the upper and lower mold halves 14 and 16, and transfers the front and back lens curves to another robot for further placement.

Molding machine 10 and robot 12 may operate on a high speed, mass production basis. For example the molding machine 10 may have a very brief cycle time—that is, the period over which the molding machine moves from an open position, to the closed position, and back to the open position, and during which a set of front and back lens curves, for example, are molded and removed from the machine. Robot 12, and specifically, arm 36 and tool 40, likewise moves in and out of the molding machine. During this time, the robot arm also engages a set of molded curves, carries those curves out of the molding machine, and transfers the curves to another robot.

As a result of this high speed operation, it is necessary occasionally to replace arm 36 and/or tool 40. In accordance with the present invention, collar 34 is specifically designed to facilitate removing the collar, and thus arm 36 and tool 40, from shaft 24. Generally, collar 34 is designed such that installation or removal does not require the shaft 24 be pushed linearly through the diameter of the collar. Rather, the installation or removal of the collar 34 is performed by moving the collar, or the collar components, away from the shaft 24, in a direction perpendicular to the shaft centerline instead of along and over the shaft diameter to the endpoint.

Two embodiments of the collar are described below. The first, illustrated in FIGS. 2–4, is a multiple piece component; and the second, shown in FIGS. 5–8, is a single slotted body.

Figure 2:
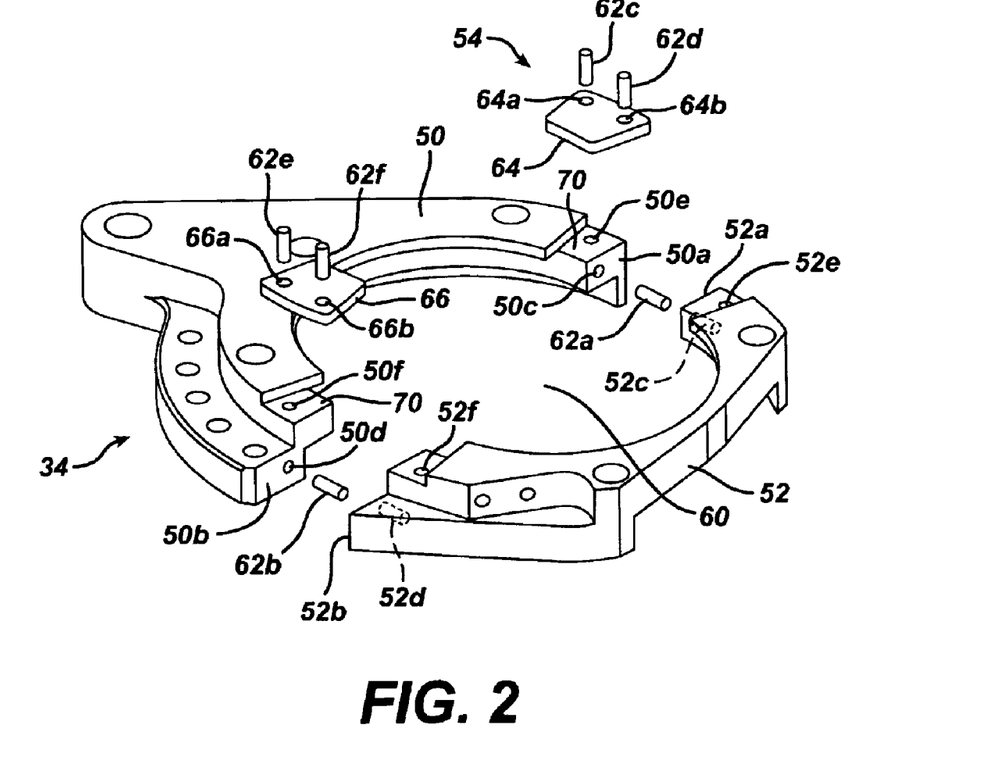
FIGS. 2 and 3 are perspective views showing a first embodiment of a split collar that may be used in the robot assembly of FIG. 1.
Figure 3:
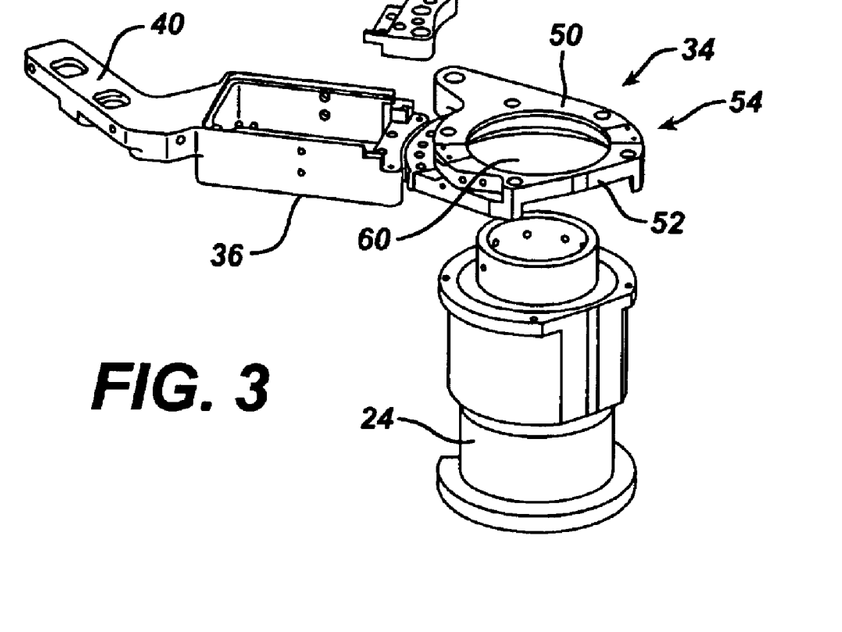
Figure 4:
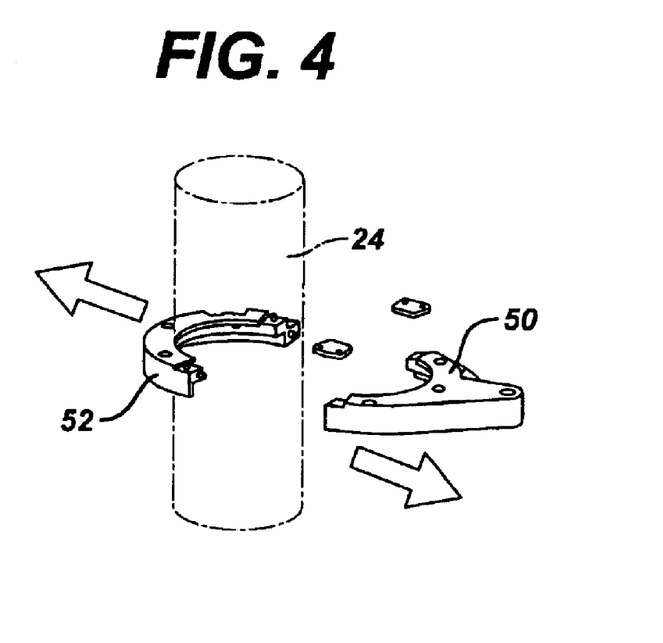
FIG. 4 is a perspective view showing how the collar of FIGS. 2 and 3 can be installed on and removed from a support shaft.
Figure 5:
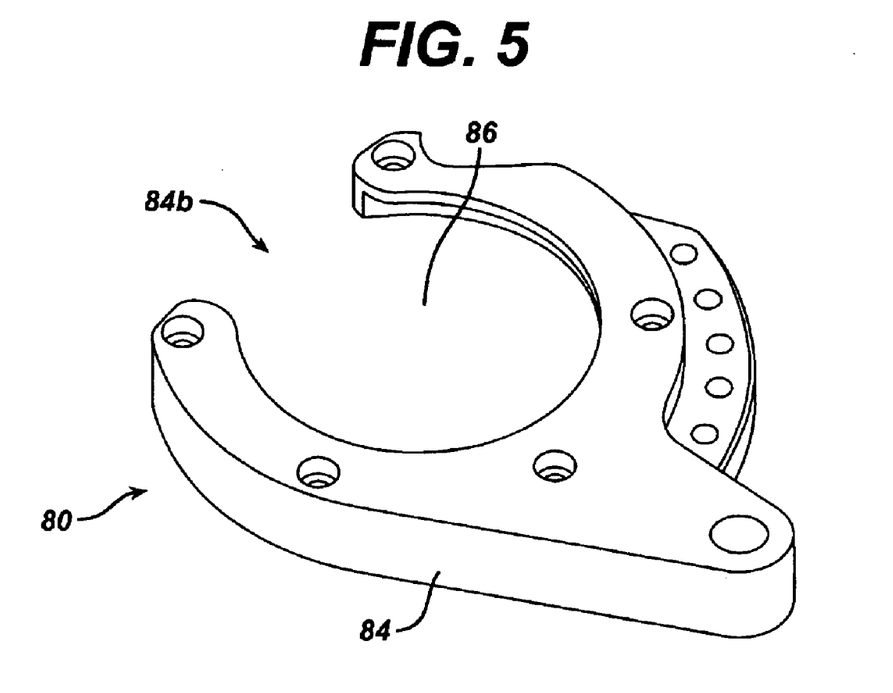
FIGS. 5, 6 and 7 illustrate a second embodiment of a split collar that may also be used in the robot assembly of FIG. 1.
Figure 6:
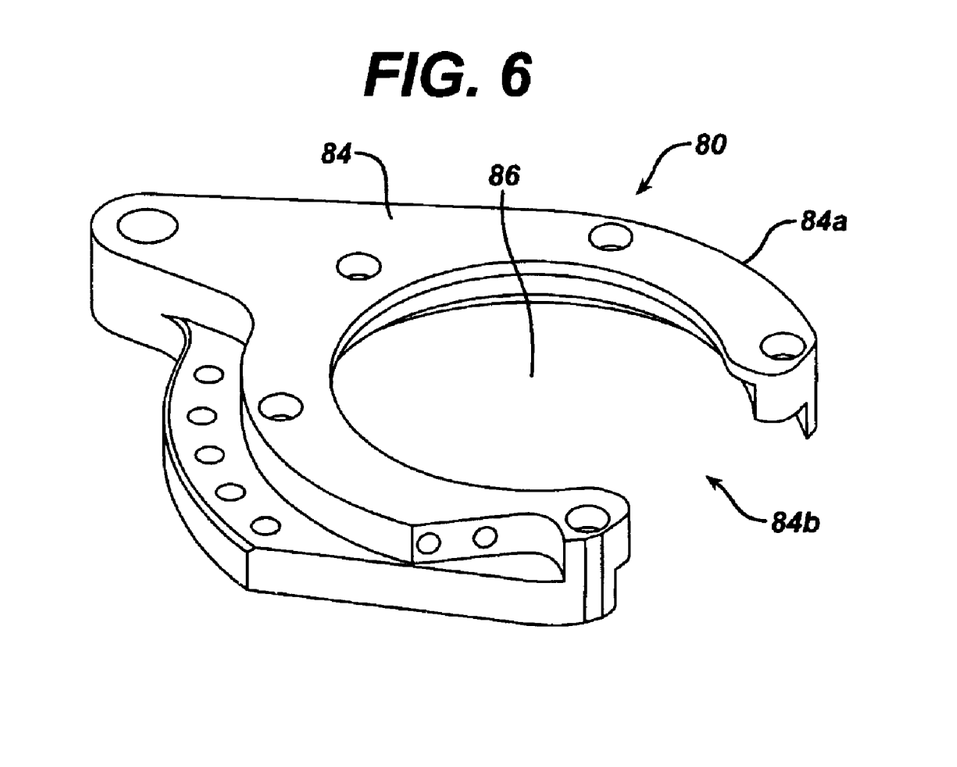

With reference to FIGS. 2–4, collar 34 includes first and second sections 50 and 52, and connecting means 54. Generally, sections 50 and 52 are used to form the body of the collar, and connecting means 54 is used to connect together those collar sections.

More specifically, each of the sections 50 and 52 has an arcuate shape, and each of the sections defines a pair of end faces. In particular, section 50 defines end faces 50a and 50b, and section 52 defines end faces 52a and 52b. When the sections 50 and 52 are connected together, end faces 50a and 52a abut against each other, and end faces 50b and 52b abut against each other, and the sections 50 and 52 form a substantially continuous ring, defining a circular, central opening 60.

Connecting means 54 connects together the collar sections 50 and 52 across the adjacent end faces. To elaborate, each of the collar sections 50 and 52 defines a pair of sockets extending inward from the end faces of the collar. In particular, end portions of collar section 50 define sockets 50c and 50d extending inward from end faces 50a and 50b, respectively; and similarly, end portions of collar section 52 define sockets 52c and 52d extending inward from end faces 52a and 52b, respectively. When collar sections 50 and 52 are connected together, end faces 50a and 52a abut against each other, with sockets 50c and 52c aligned with each other, and similarly, end faces 50b and 52b abut against each other, with sockets 50d and 52d aligned with each other. At the same time, pin 62a is located in the aligned sockets 50c and 52c, and pin 62b is located in the aligned sockets 50d and 52d. In this way, the pins 62a and 62b hold collar sections 50 and 52 together against axial and transverse movement.

Retaining plates 64 and 66 and pins 62c and 62d are used to hold releasably the collar sections 50 and 52 together against movement away from each other. More specifically, each of the collar sections 50 and 52 defines a pair of axially extending sockets adjacent, but slightly spaced from, the end faces of the collar sections. In particular, collar section 50 defines axial sockets 50e and 50f and, and collar section 52 defines axial sockets 52e and 52f.

Also, retaining plate 64 defines a pair of through openings 64a and 64b, and retaining plate 66 defines a pair of through openings 66a and 66b. When collar sections 50 and 52 are connected together, retaining plate 64 sits on ends of the collar sections, bridging these two ends, and with openings 64a and 64b aligned with sockets 50e and 52e, and pins 62c and 62d extend through openings 64a and 64b and into sockets 50e and 52e, connecting together these two ends of the collar sections. Likewise, retaining plate 66 sits on ends of the collar sections, bridging these two ends, and with openings 66a and 66b aligned with sockets 50f and 52f, and pins 62e and 62f extend through openings 66a and 66b and into sockets 50f and 52f, connecting together these two ends of the collar sections.

Preferably, the ends of the collar sections define stepped down, recessed portions 70, and retaining plates 64 and 66 have thin flat shapes and fit into these recessed portions in a complementary manner. In this way, the tops of the retaining plates 64 and 66 are coplanar, or flush, with the top surface of the rest of the collar 34.

To install collar 34 on shaft 24, the collar sections 50 and 52 are placed on opposite sides of the shaft. The collar sections are then moved toward the shaft and toward each other, until end faces 50a and 52a and 50b and 52b abut against each other. The collar sections are then connected together, using plates 64 and 66 and pins 60a, 60b, 60c, 60d, 60e and 60f, thereby securing the collar on the shaft. To remove the collar 34, the collar sections 50 and 52 are disconnected from each other, and then those collar sections are pulled away from the shaft 24, in opposite directions, perpendicular to the shaft centerline.

FIGS. 5–8 illustrate an alternate collar 80, which forms a circumferential slot to allow the collar to be easily mounted on and removed from a shaft 82 by moving the collar in a direction perpendicular to the shaft axis. More specifically, collar 80 includes a main or body portion 84 that forms an arc 84a extending approximately 260° around a central opening 86, and this main portion 84 thus also forms an approximately 100° arcuate slot 84b.

Figure 7:
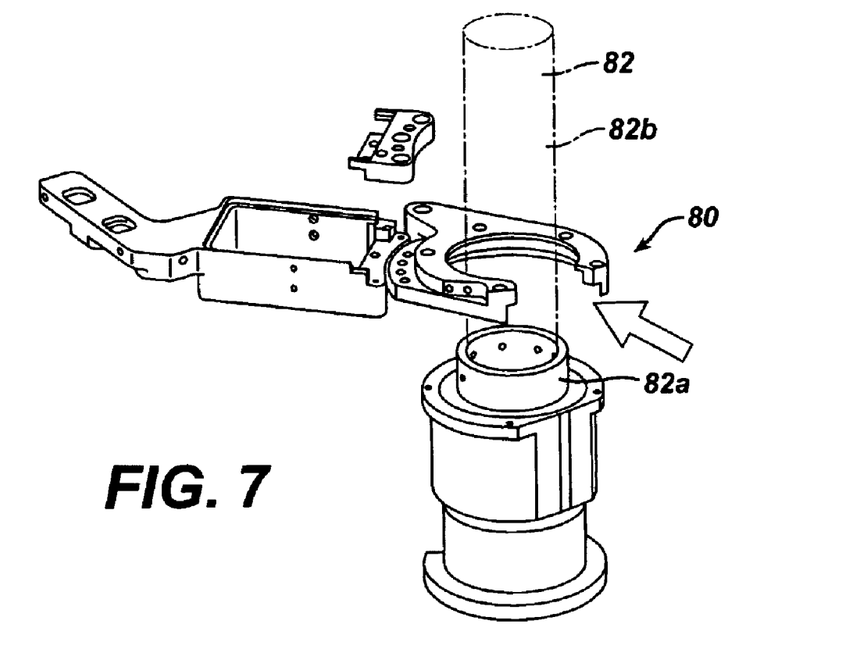

Collar 80 is designed for use with a support shaft, of the type shown at 82 in FIG. 7, which has wider and thinner portions 82a and 82b. The slot 84b of collar 80 is large enough that thinner portion 82b of the shaft will fit through that slot; and the diameter of the central opening 86 of the collar is just slightly larger than the diameter of the wider portion 82a of the shaft.

Figure 8:
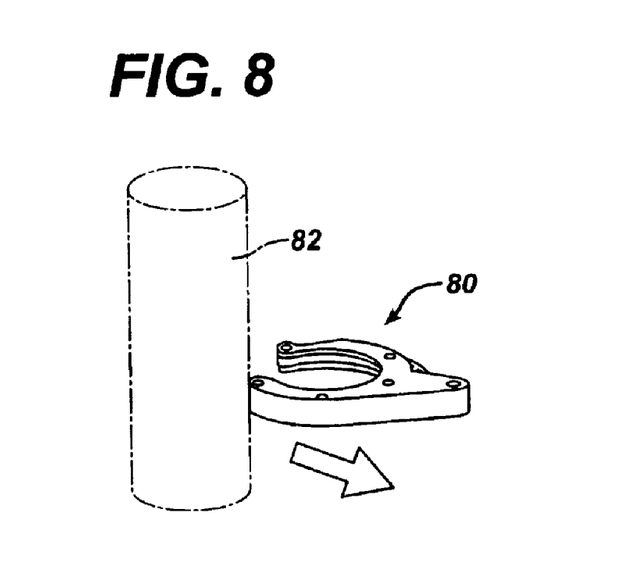
FIG. 8 shows how the collar of FIGS. 5–7 can be mounted on and removed from the support shaft.

To install collar 80 on shaft 82, the collar is moved so that the thinner portion 82b of the shaft is passed through slot 84b, and then the collar is moved downward onto wider portion 84a. Collar 80 may be held in position by bolting vertically downward to a bearing housing on the shaft.

The present invention provides a number of important advantages. For instance, the replacement of components is accomplished with simple hand tools and without the need to remove machine guarding or panels. Also, major components of the machine do not have to be disturbed, disassembled or removed to perform the replacement/repair. In addition, machine downtime to replace a damaged collar component and to restart the machine is significantly reduced. Further, the simple and fast replacement of the collar allows for immediate action in case the collar begins to adversely affect machine performance, and it is not necessary to wait for regular maintenance days to change the collar.

Any molded items, preferably ophthalmic molded parts, e.g. lenses and lens curves, can be handled using the robot assembly of this invention. Although the following description will describe the handling of lens curves (made by injection molding in the molding machine shown in FIG. 1), using the robot assembly of this invention, it is understood that other molded articles can be substituted for the lens curves described herein.

Figure 9A:
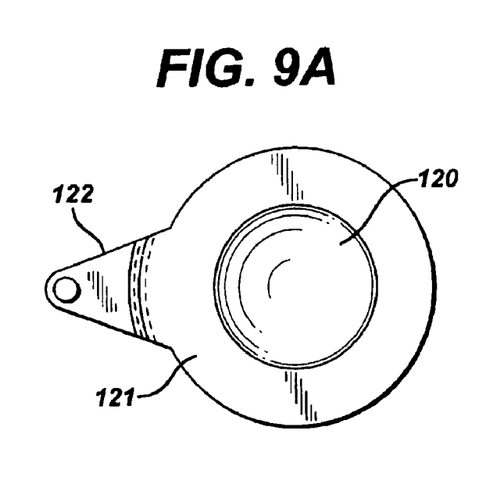
Figure 9B:
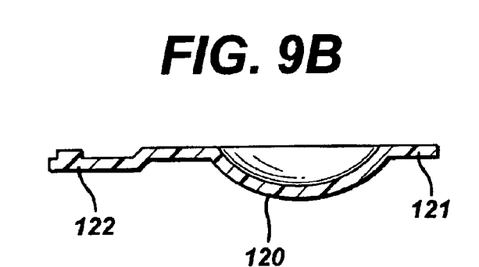
Figure 9C:
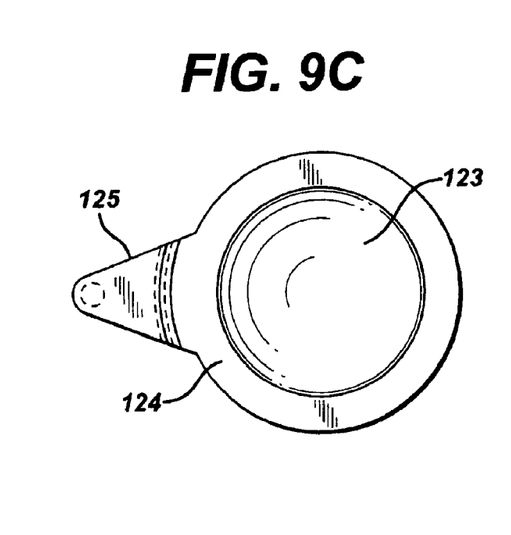
FIGS. 9C and 9D illustrate the top and edge views of a typical Back Curve; the molded items preferably handled by the robot assembly.
Figure 9D:
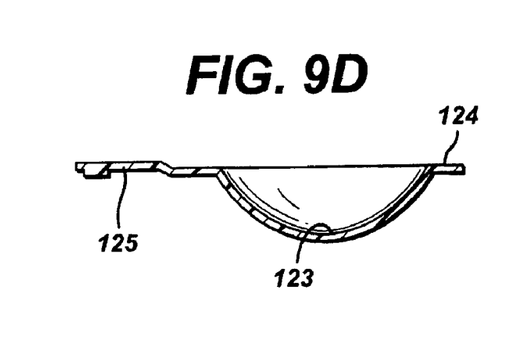

FIGS. 9A and 9B depict a top and side view, respectively, of a lens curve, particularly a Front Curve; similarly, FIGS. 9C and 9D depict top and side views of a Back Curve. A Front Curve and Back Curve pair is used for making contact lenses by methods disclosed in the prior art. In preferred practices, the lens curves are fabricated with handling means thereon. The handling means can be surfaces or other appendages that are apart from the optically important central surface. In FIG. 9, a preferred handling means is illustrated as annular flange 121 (Front Curve) and annular flange 124 (Back Curve). Tabs 122 and 125 may optionally be provided to further facilitate handling and positioning. It is preferred that the transfer tip only contacts handling means on the lens curves.

In a preferred practice, the molding machine that produces the Back Curve is designed so that upon separation of the opposing mold elements, the concave surface 123 of the Back Curve is exposed. Conversely, the molding machine for the Front Curve separates such that the convex surface 120 of the Front Curve is exposed. As shown in FIG. 1, the end of arm tool has one or more transfer tips 44 that are connected to a vacuum source that is not shown that is activated to pick up the molded lens curves. The transfer tips that contact the lens curves may be soft flexible materials, such as silicones and rubbers, in the form of variously shaped end effectors, suction cups, tips, pads, bellowed fingers, and the like. Examples of such transfer tips are disclosed in U.S. Pat. Nos. 5,540,543; 5,681,138; 5,895,192; 5,980,184; 6,007,229; 6,077,031; 6,079,940; 6,176,669; 6,180,032; and 6,186,736, incorporated herein by reference. Soft flexible materials are often employed because, in a high speed production line, the lens curves may be removed when they are still relatively hot, pliant and deformable. The soft tips may prevent deformation of the lens curves.

Figure 10:
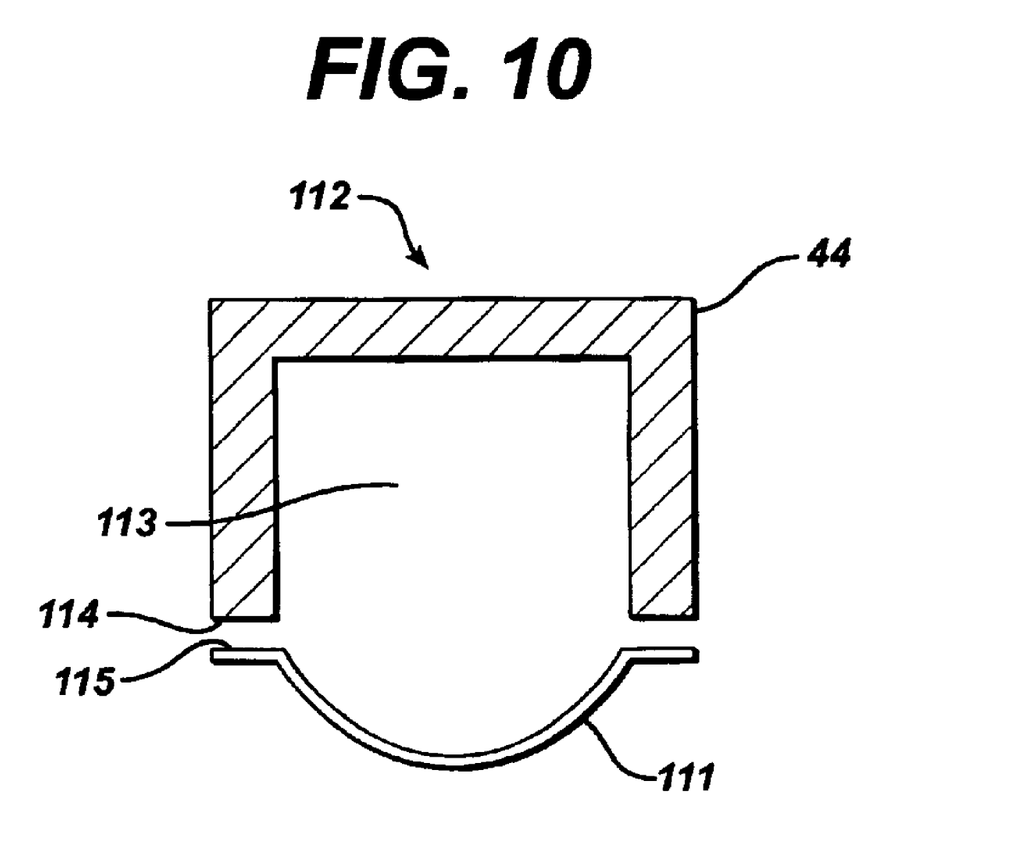
FIG. 10 illustrates one embodiment of a transfer tip useful on the robot assembly of this invention.

FIG. 10 illustrates one useful transfer tip 4. FIG. 10 is a cross-sectional side view showing transfer tip 44, made of a soft, flexible material such as silicone rubber, which tip is cylindrical in shape and open at the pickup end, defined by annular rim 114. As seen in FIG. 10, the annular rim 114 of tip 44 contacts the injection molded lens curve 111 (depicted in FIG. 10 as a Back Curve) at flange 115. Transfer tip 44 is connected via aperture 112 to a vacuum source which, when actuated, enables pickup of lens curve 111. In the preferred embodiment, the robot assembly removes one or more lens curves from a first location, e.g. from a molding machine, preferably an injection molding machine, and transfers the lens curves to a second location, e.g. a conveyor pallet, or to another transfer robot and then to a pallet, and then returns to the first location to repeat the process.

The preferred transfer tips of the robot assembly comprise substantially rigid body portions, and a distal end and a proximal end; the distal end having an outer surface that is complementary to the concave or convex shape of the lens curve to be handled, said body portion having sealing means peripheral to said outer surface for engagement with said lens curve; and at least one aperture extending through said body portion from said proximal end to said distal end sufficient for flow communication with a source of differential pressure.

Figure 11A:
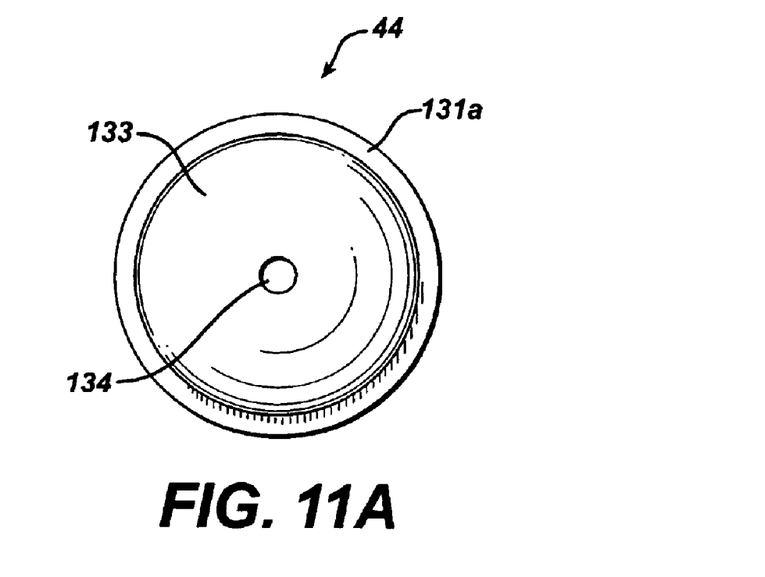
FIGS. 11A and 11B respectively illustrate top (distal end) and side views of a second embodiment of a transfer tip useful on the robot assembly of this invention particularly suited to the transfer of the Back Curve shown in FIG. 9.
Figure 11B:
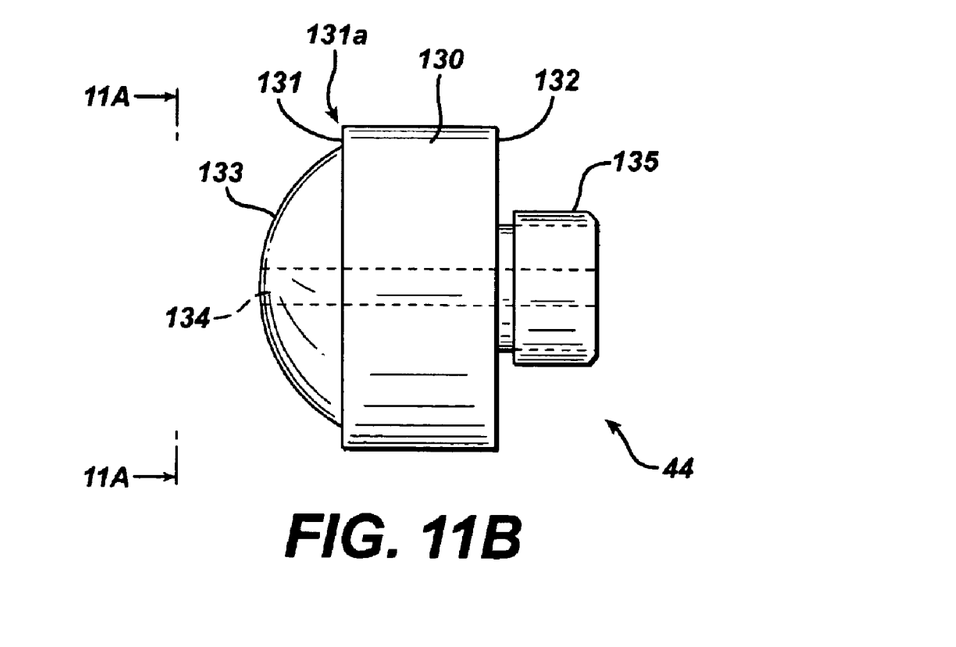
Figure 12A:
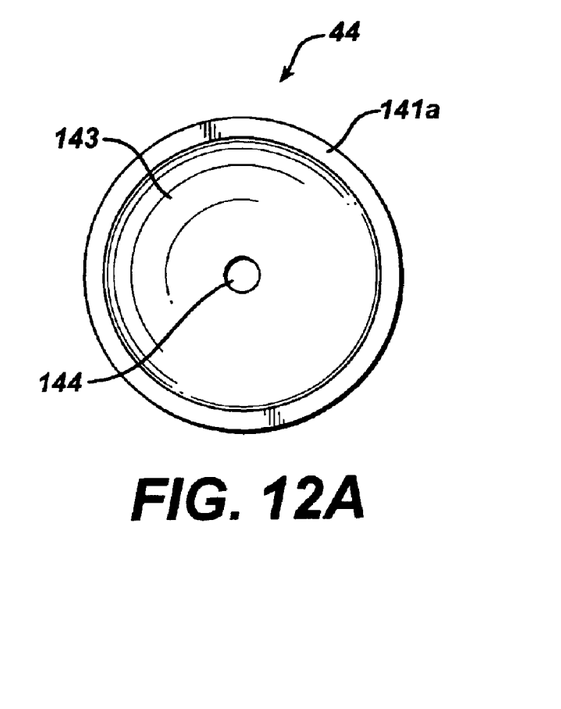
FIGS. 12A and 12B respectively illustrate top (distal end) and side views of a transfer tip embodiment of the present invention particularly suited to the transfer of the Front Curve shown in FIG. 9.
Figure 12B:
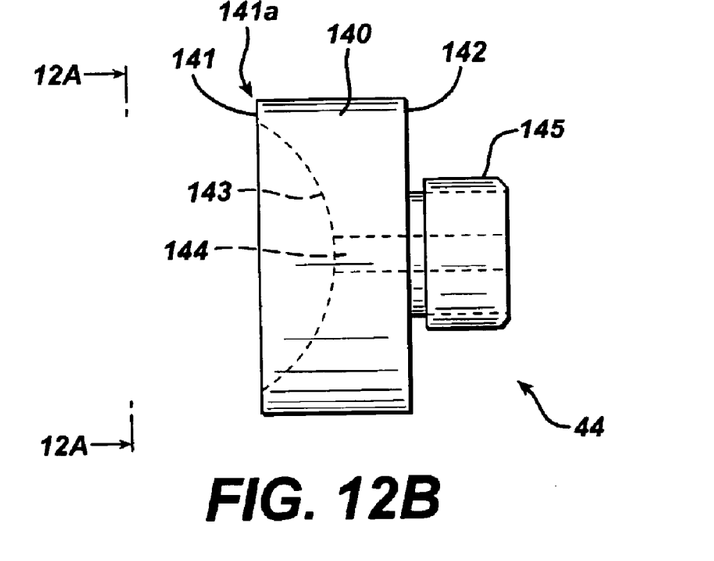
Figure 13A:
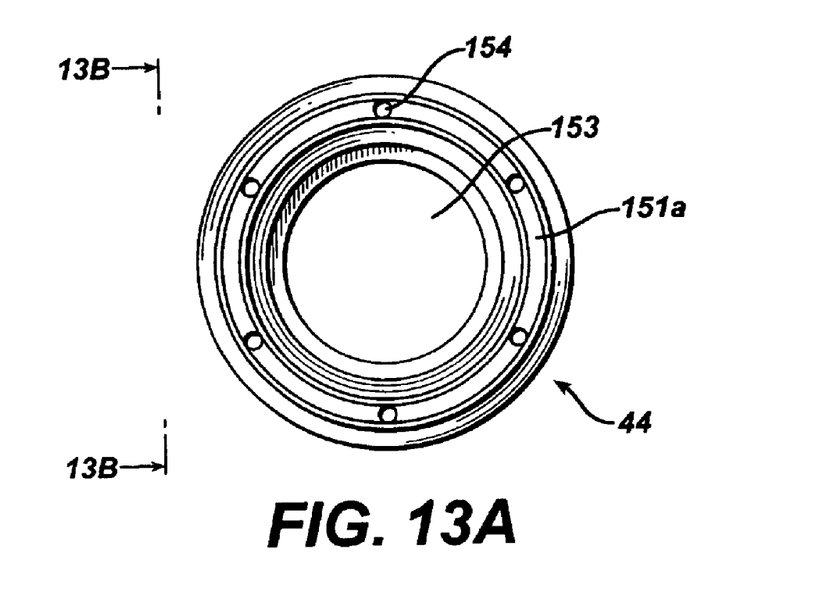
FIGS. 13A and 13B respectively illustrate top (distal) and side views of a transfer tip embodiment of the present invention suited to either the Front or Back Curves shown in FIG. 9.
Figure 13B:
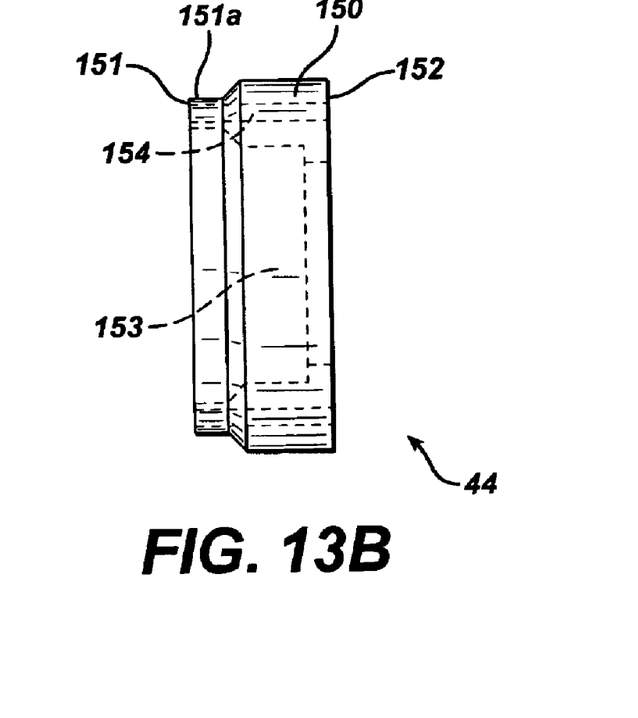

The preferred transfer tips useful on the robot assembly of this invention are shown in FIGS. 11, 12, and 13. The transfer tips preferably pick up and place lens curves having shapes similar to those shown in FIG. 9. It will be appreciated that the size and shapes of the transfer tips can be modified to accommodate differently shaped molded articles, e.g., differently shaped lens curves.

FIGS. 11A and 11B show top and side views, respectively, of a preferred embodiment of the transfer tip useful in handling lens curves having a concave shape, such as, the Back Curve illustrated at FIGS. 9C and 9D where, the concave shape is surface 123. The transfer tip is comprised of body portion 130 having a distal end (that is, the working end, or end in contact with the lens curve part that is being handled) generally at 131 and a proximal end, generally at 132, which proximal end serves as the connection to the robotic assembly and to the source of pressure differential such as vacuum means or positive (gas) pressure (not shown). The distal end, generally at 131, has an outer surface 133 which is complementary, in shape, to the concave shape of the lens curve part to be handled. For example, outer surface 133 is of a convex shape that is complementary to concave surface 123 of the Back Curve in FIG. 9 so as to be as close to form-fitting to surface 123 (the area of non-optically relevant curvature of the lens curve) as practicable without impinging on same. The body portion further has a sealing means peripheral to the outer surface. The sealing means may be in the form of annular sealing ring 131a. Preferably, the sealing means on the transfer tip and the handling means on the lens curve are both in the same plane; preferably both are flat, sufficient to create and maintain a seal (by e.g. vacuum) effective to enable part pickup. For example, in the embodiments shown, annular sealing ring 131a is in the same plane as annular flange 124 on the Back Curve FIG. 9.

Body portion 130, including outer surface 133, is substantially rigid. For example, it is of a constitution that will not deform, and will maintain its dimensions and geometry under the elevated temperatures present on and about the lens curve as removed from the molding machine, and under the pressures of the applied force created between the sealing means of the transfer tip and the handling means (e.g. flange) of the molded part. The substantially rigid nature of body portion 130 is preferably obtained through choice of materials of construction. Generally speaking, any material having a hardness sufficient to enable it to be machined or otherwise shaped to have the requisite geometry and dimensional tolerances, e.g. flatness and the like, to achieve a workable seal, without deformation or distortion of the transfer tip when subjected to the applied sealing pressures with the lens curve, and which also has requisite thermal strength for the temperatures involved, can be used. This includes a variety of polymeric materials, metals, ceramics, cellulosic materials and the like. In a preferred practice, the material of construction has a Shore D Hardness of about 58 to about 90; more preferably about 75 to about 90; still more preferably about 85 to about 87. Serviceable polymeric materials include, without limitation, engineering grade plastics. Self-lubricating polymeric materials can be advantageously used to avoid sticking or adhering of the hot lens curve to the transfer tip. By way of exemplification only, and without constraining the scope of possible materials, useful polymeric materials include polyacetyls (e.g. Delrin®, which is most preferred, having a Shore D Hardness of about 86), polystyrenes, polypropylenes, polyethylenes, polyetheretherketones (PEEK), polyamides (e.g. Nylon®), polyimides, polyamideimides (PAI), polyfluoroethylenes (e.g. Teflon®), polyetherimides, polyesters, polycarbonates, polyethers, polyetherimides, polysulfide polymers, polysulfones, and blends and alloys of the foregoing. Polyacetyls, such as Delrin®, are preferred. Useable metals include, for example, aluminum, stainless steel and like elemental metals and alloys that can be machined into the appropriate geometry, dimensional tolerances and sealing flatness.

In another preferred practice, the transfer tip 44 is machined entirely from a unitary block of material, e.g. Delrin®, using a lathe or other suitable means known in the art.

Also as shown in FIG. 11, the transfer tip has at least one aperture 134 extending through said body portion 130 sufficient for flow communication with a source of differential pressure. The aperture can be one or more holes or bores of sufficient size drilled through the transfer tip. A single aperture through the center of the transfer tip is preferred. The source of differential pressure can include vacuum or positive (gas) pressure sources as known in the art. For example, vacuum is drawn through aperture at the center of the transfer tip to create differential pressure in the spatial volume between the transfer tip and the lens curve. As illustrated in FIG. 11, the transfer tip preferably has at the proximal end 132 connection means for connection to said robotic assembly, such as for example a threaded portion 135 for conveniently removable connection to same. Other means of connection known in the art may also be employed.

FIGS. 12A and 12B show top and side views, respectively, of a preferred embodiment of a transfer tip useful in handling lens curves having a convex shape, such as for example, the Front Curve illustrated at FIGS. 9A and 9B, where the convex shape is surface 120. The definitions and descriptions provided for the embodiment of FIG. 11 aforesaid apply hereto unless otherwise indicated. FIG. 12B shows a side view of said preferred transfer tip 44 having substantially rigid body portion 140 having a distal (working) end generally at 141 and a proximal (connection) end generally at 142 which end is ultimately connected to the robotic assembly and a source of pressure differential as hereinbefore described. The distal end, generally at 141, has an outer surface 143 whose shape is complementary to the shape of the lens curve; that is, outer surface 143 is concave whereas the shape of the lens curve, e.g. the Front Curve, is convex. Again, it is preferred if the concave outer surface 143 is as close to form-fitting the convex Front Curve surface 120 as practicable without impingement. Substantially rigid body portion 140 also has thereon a sealing means in the form of an annular sealing ring 141a, which in the embodiment of FIG. 12 is in the form of the rim or edge 141a of the body portion 140, flat and in the same plane as e.g. flange 121 on Front Curve FIGS. 9A and 9B. Body portion 140 further has at least one aperture 144 extending therethrough from said proximal end 142 to said distal end 141 for flow communication with a source of differential pressure. As depicted, it is preferred if proximal end 142 further comprises connection means for attachment to said robotic assembly, such as for example threaded portion 145.

FIGS. 13A and 13B show top and side views respectively, of yet another embodiment of a transfer tip, this particular embodiment being useful for handling either Front or Back Curves. Again the definitions and descriptions provided for the embodiments of FIGS. 11 and 12 aforesaid apply hereto unless otherwise indicated. FIG. 13B shows a side view of said transfer tip having a distal (working) end generally at 151 and a proximal end generally at 152 ultimately connected to the robotic assembly and source of pressure differential as hereinbefore described (connection means not shown in FIG. 13). Substantially rigid body portion 150 has at distal end 151 a sealing means in the form of an annular sealing surface 151a, which in the embodiment of FIG. 13 is in the form of a rim or edge 151a of said body portion. Body portion 150 furthermore has a plurality of apertures 154 extending from the proximal end 152 to said annular sealing surface 151a. In a preferred practice, the plurality of apertures, e.g. holes through said rim 151a to said proximal end 152, are equally spaced around the circumference of the annular sealing surface, e.g., six holes, each about 60° apart. The equidistant nature and uniformity in size of the holes in the annular sealing surface 151a results in an equalization and uniformity of forces felt by the lens curve being handled. In practice, when the transfer tip of FIG. 13 is employed to handle a lens curve having a convex shape (e.g. Front Curve), the convex surface of same (e.g. surface 120 of FIG. 9) is situated in void 153, with annular sealing surface 151a engaged with flange 121.

Alternatively, another useful transfer tip that is not shown could be made by modifying the embodiment shown in FIGS. 13A and 13B to add the convex and concave rigid shapes 133, and 143 of the embodiments shown in the FIGS. 11A and 11B and FIGS. 12A and 12B while maintaining the plurality of apertures 154 as shown in FIGS. 13A and 13B. The apertures 134 and 144 as shown in FIGS. 11A and 11B and FIGS. 12A and 12B are optional.

In the most preferred embodiments, the transfer tips of FIGS. 11, 12 and 13 are machined from a unitary block of polyacetyl, such as Delrin®, having a Shore D Hardness of about 86. The most preferred robot assembly of the invention comprises the transfer tips shown in FIGS. 11 and 12.

Plastics that commonly serve as materials of construction for injection molded lens curves in this regard are from the family of thermoplastics and can include without limitation: polyolefins, such as low-, medium-, and high-density polyethylene, polypropylene, and copolymers thereof; polystyrene; poly-4-methylpentene; polyacetal resins; polyacrylether; polyarylether; sulfones; Nylon 6; Nylon 66; Nylon 11; thermoplastic polyester and various fluorinated materials such as the fluorinated ethylene propylene copolymers and ethylene fluoroethylene copolymers. Polystyrene is preferred.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A robot assembly for removing molded items from a molding machine, the robot assembly comprising:
   a support shaft; an arm extending away from the shaft;
   a connecting collar pivotally mounted on the support shaft and connected to the arm to connect the arm to the support shaft; and
   a tool connected to the arm for engaging the molded items and for removing the molded items from the molding machine;
   wherein the collar includes:
   i) first and second sections, the first section having an arcuate shape to seat against a first side of the shaft, the second section also having an arcuate shape to seat against a second side of the shaft, opposite the first section, and
   ii) connecting means to connect together the first and second sections to form a substantially continuous ring extending around the shaft; and wherein, the first collar section includes a pair of end portions defining a pair of end faces and a pair of sockets extending inward from the end faces the second collar section includes a pair of end portions defining a pair of end faces and a pair of sockets extending inward from the end faces of the second collar section;
   when the collar sections are connected together, the end faces of the first collar section abut against the end faces of the second collar section, with sockets of the first collar section aligned with sockets of the second collar section; and
   the connecting means includes a pair of pins positioned in the sockets of the first and second collar sections to hold the collar sections together against axial and transverse movement.

2. A robot assembly according to claim 1, wherein:
   the first collar section further defines an axial socket axially extending adjacent one of the end faces of the first collar section;
   the second collar section further defines an axial socket axially extending adjacent one of the end faces of the second collar section; and
   the connecting means further includes
   a connecting plates extending across said ones of the end faces of the first and second collar sections and defining first and second openings aligned with the axial openings of the first and second collar sections respectively,
   a first axial pin extending through the first opening of the connecting plate and into the axial socket of the first collar section, and
   a second axial pin extending through the second opening of the connecting plate and into the axial socket of the second collar section, wherein the connecting plate and the first and second axial pins connect the collar sections together against movement away from each other.

3. A robot assembly according to claim 2, wherein: end portions of the first and second collar sections are stepped downward to define a recess; and
   the connecting plate is positioned in said recess.

4. A robot assembly for removing molded items from a molding machine, the robot assembly comprising:
   a support shaft;
   an arm extending away from the shaft;
   a connecting collar pivotally mounted on die support shaft and connected to the arm to connect the arm to the support shaft; and
   a tool connected to the arm for engaging the molded items and for removing the molded items from the molding machine;
   wherein the collar includes a main arcuate shaped section defining a central opening for receiving the support shaft, said main section extending around a major portion of the central opening and also defining an arcuate slot to enable the support shaft to pass through the arcuate slot and into and out of the central opening
   wherein the main section of the collar extends around the central opening at least 240 degrees.

5. A method of removing a collar from a support shaft, comprising the step of:

removing the collar from the shaft by moving the collar away from the shaft in a direction perpendicular to the shaft centerline;

wherein the collar has an open ring shape and defines a circumferentially extending slot, and the removing step includes the step of moving said slot across the shaft; and wherein the support shaft includes a wider portion and a thinner portion, and the collar is mounted on said wider portion, and the removing step includes the step of first moving the collar off the wider portion to an area extending around the thinner portion of the shaft, and then moving the collar away from the shaft in said direction perpendicular to the shaft centerline.

6. A method according to claim 5, wherein the wider portion of the shaft is below the thinner portion of the shaft, and the step of moving the collar off the wider portion includes the step of moving the collar upwards off said wider portion.

7. A method according to claim 5, wherein: the collar includes a body forming a substantially enclosed ring, and including first and second arcuate shaped sections connected together to form said substantially enclosed ring; and the removing step includes the steps of i) disconnecting the first and second sections from each other, ii) moving the first section away from the shaft in a first direction, and iii) moving the second section away from the shaft in a second direction, substantially opposite from the first direction.

8. A method according to claim 7, wherein the first and second sections are disconnected from each other as said sections are moved away from the shaft.

9. A method according to claim 8, wherein the first and second sections are connected together by means of a pair of pins held in and by said first and second sections, and the first and second sections are disconnected from each other by moving said sections away from the shaft along the axis of said pins.

10. A method according to claim 9, wherein the first and second sections are also connected together by means of a connecting plate connected to both of said sections, and the removing step includes the step of removing said connecting plate before moving the first and second sections away from each other.

* * * * *